United States Patent [19]

Gillette

[11] 4,153,329
[45] May 8, 1979

[54] OPTICAL CROSSPOINT SWITCH HAVING MODE-CONVERSION FACILITIES

[75] Inventor: Dean Gillette, Rumson, N.J.

[73] Assignee: Bell Telephone Laboratories, Incorporated, Murray Hill, N.J.

[21] Appl. No.: 818,670

[22] Filed: Jul. 25, 1977

[51] Int. Cl.² .......................... G02B 5/14; G02F 1/09
[52] U.S. Cl. ................................ 350/96.13; 350/151; 350/96.19
[58] Field of Search .............. 350/96.12, 96.13, 96.14, 350/96.16, 96.18, 151

[56] References Cited

U.S. PATENT DOCUMENTS

| 3,870,397 | 3/1975 | Dillon, Jr. et al. | 350/96.13 |
| 3,990,776 | 11/1976 | Tseng | 350/96.13 |
| 4,032,216 | 6/1977 | Henry | 350/151 |

OTHER PUBLICATIONS

R. A. Soref, "Optical Switch Study", Sperry Research Center Report, #RADC-TR-75-3, Feb. 1975, pp. 17, 19, 43-46.

*Primary Examiner*—John K. Corbin
*Assistant Examiner*—Rolf Hille
*Attorney, Agent, or Firm*—Burton I. Levine

[57] ABSTRACT

A plurality of crossed input and output optical channels are arranged in coordinate fashion to define a crosspoint array. A pair of jointly operable mode switches are disposed in the respective channels that form each crosspoint. Operation of the mode switch on the input side of a selected crosspoint causes incident light energy to be converted from a first mode (e.g., the $TE_0$ mode) to a second mode (e.g., the $TM_0$ mode). When the so-converted mode reaches the crosspoint, a reflection-type filter transparent to the first mode reflects such second mode into the other channel, where it is then reconverted back to the first mode by the operated mode switch on the output side of the crosspoint. The overall assembly may be formed by thin-film techniques on a supporting substrate.

9 Claims, 4 Drawing Figures

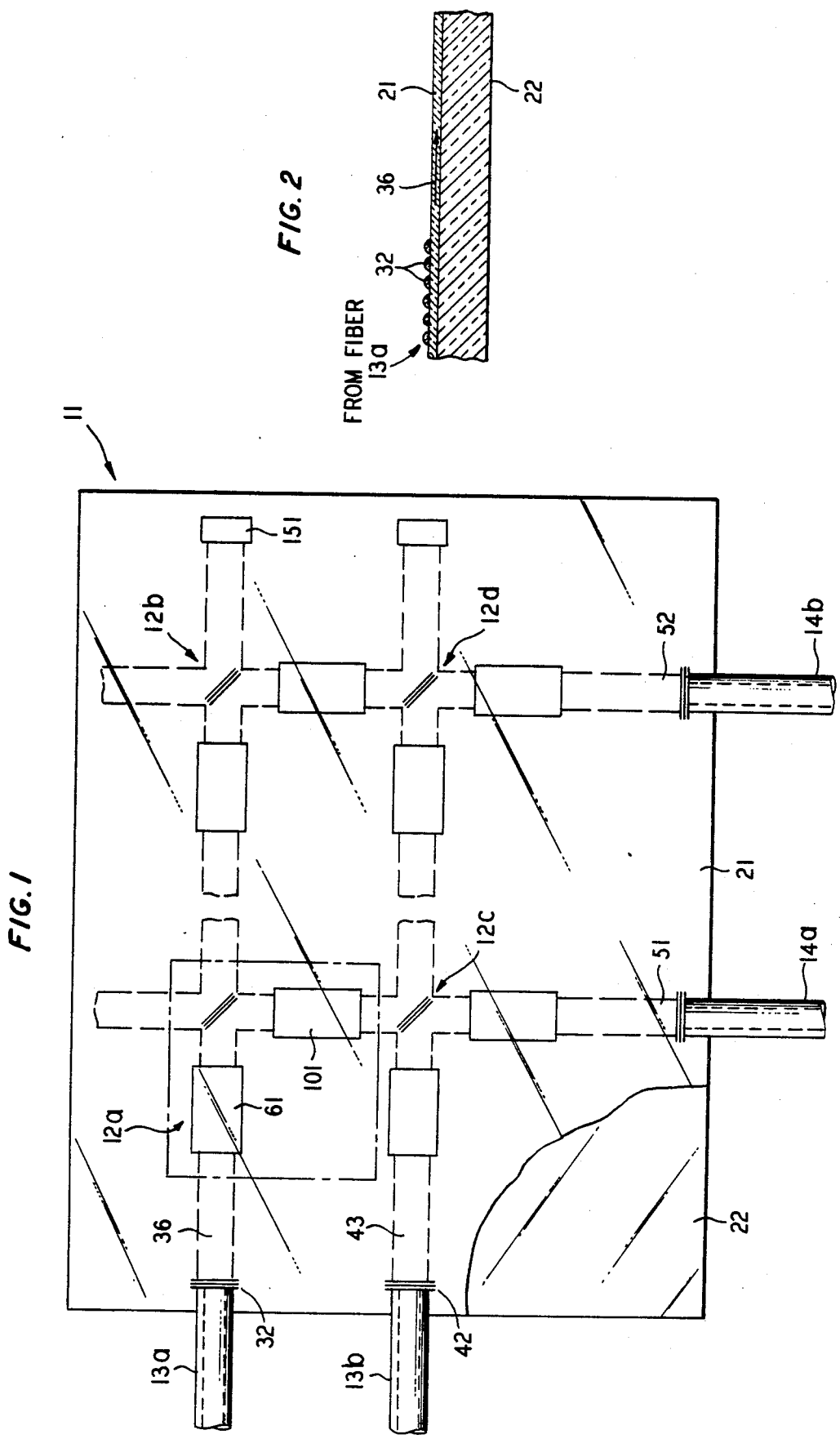

OPTICAL CROSSPOINT SWITCH HAVING MODE-CONVERSION FACILITIES

BACKGROUND OF THE INVENTION

The invention relates to improvements in electromagnetic crosspoint switches, particularly for optical transmission.

Several proposals have been made in the past involving an optical crosspoint array which employs acoustic-optic interaction for selectively deflecting an input beam of light energy propagating along the axis of an optical channel. Such channel is conventionally defined, e.g., on a substrate-supported film.

Each of such proposed acoustic-optic arrangements has one or more disadvantages. In one technique, for example, separate piezoelectric transducers must be affixed to the lateral edges of the substrate at each of the crosspoints; this leads to a complicated and bulky assembly.

In another of such arrangements, the input and output channels are individually defined in parallel fashion on opposite surfaces of a common substrate. In addition to the complex processing steps necessary for this, such design requires for its switching operation the physical movement of a pair of beam-guide couplers that are disposed at the opposite surfaces of the substrate.

Optical crosspoint matrix designs using magneto-optic conversion have also been proposed. These designs have contemplated the use, at each crosspoint, of at least one directional coupler to extract only a portion of the incident energy for processing through the array. The insertion loss exhibited by such scheme is relatively large and cumulative over the path of propagation of an optical beam through the device.

SUMMARY OF THE INVENTION

An improved optical crosspoint switch which can be efficiently and inexpensively fabricated by thin-film techniques and which substantially avoids the problems indicated above is provided by the present invention.

In an illustrative embodiment, a plurality of magnetic thin-film optical channels are disposed on a common planar substrate in crossed coordinate fashion to define an array of crosspoints. Each channel is arranged to normally propagate at least two prescribed modes, e.g., the $TE_0$ and $TE_1$ guided modes.

A reflection-type polarization mode filter (e.g., a 45 degree grating) is supported on the substrate at each crosspoint. Each such filter is made normally transparent to one of the incident modes (e.g., the $TE_0$) and substantially totally reflecting to the $TM_0$ mode so as to divert wave energy, incident from one channel in the $TM_0$ mode, into the other channel.

A pair of magneto-optic mode switches are individually supported on the substrate in mode coupling relation to the reflecting mode filter at each crosspoint. The mode switches in each pair are respectively located in the two crossed channels at the crosspoint, and are jointly operable for converting wave energy incident thereon in one of the above-mentioned $TE_0$ and $TM_0$ modes into the other of such modes.

The mode switches at each crosspoint are operated via the coincident pulsing of a pair of "X" and "Y" leads separately threaded through such switches in serial fashion.

BRIEF DESCRIPTION OF THE DRAWINGS

The invention is further set forth in the following detailed description taken in conjunction with the appended drawings, in which:

FIG. 1 is a plan view of an optical crosspoint array employing thin-film light guiding paths therein;

FIG. 2 is a fragmentary elevation view of a portion of the array of FIG. 1, illustrating a technique for coupling incident light energy onto a guided-wave mode for propagation along one of the thin-film paths of FIG. 1;

DETAILED DESCRIPTION

Figure 3:
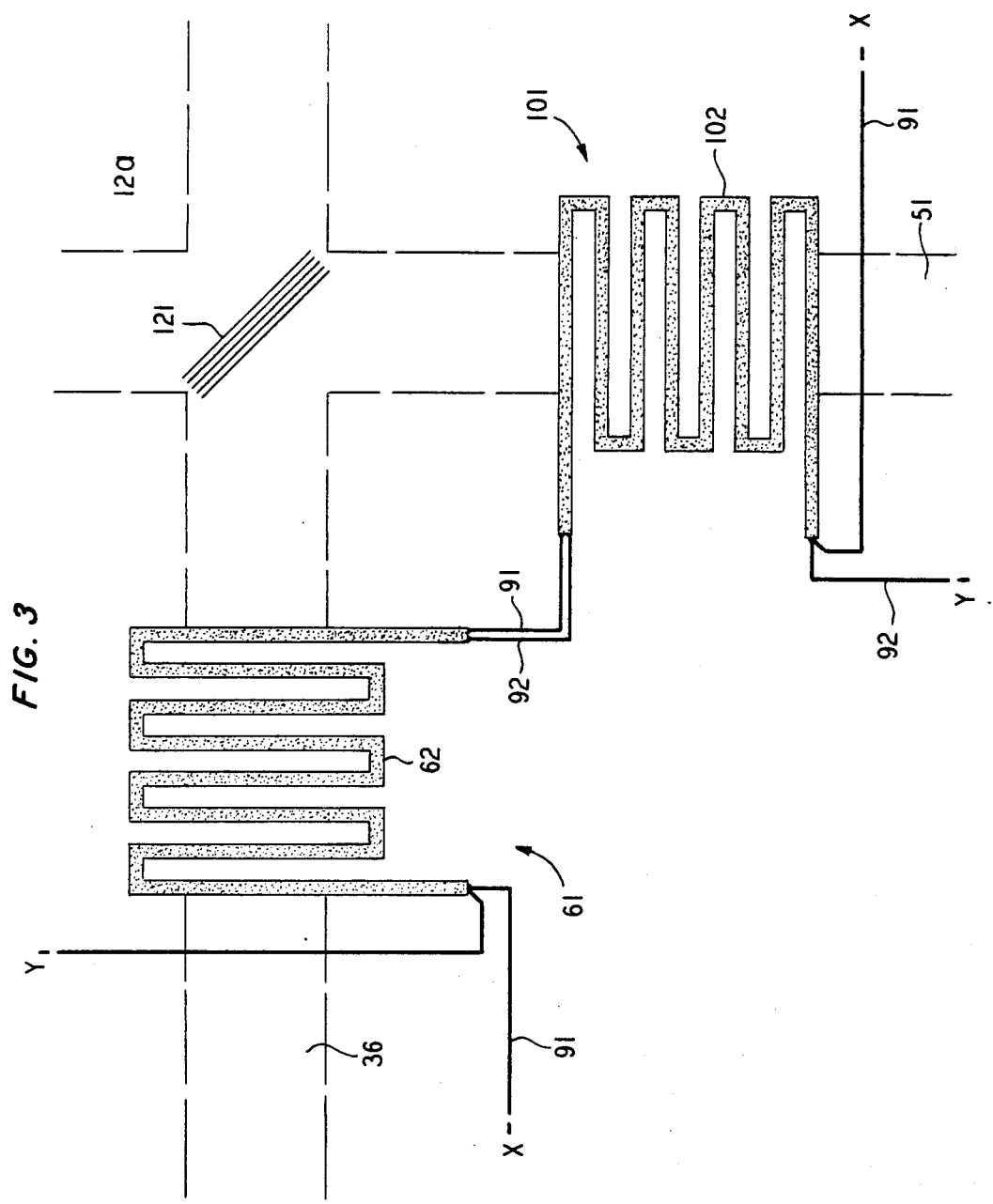
FIG. 3 is an enlarged fragmentary plan view of a typical crosspoint of the array of FIG. 1, illustrating facilities for operating such crosspoint in accordance with the invention.

Referring to the drawings, FIG. 1 depicts generally a first embodiment, in the form of a thin-film optical waveguide, of a mode-sensitive optical matrix crosspoint switch 11 constructed in accordance with the invention. For simplicity, only four crosspoints (designated 12a–12d) of the array 11 are illustrated for coupling one of a pair of input optical waveguides 13a and 13b to one of a pair of output optical waveguides 14a and 14b. In general, of course, any desired number M×N of the crosspoints 12 may be provided in the array 11 for coupling one of M input waveguides 13 to one of N output waveguides 14.

The array 11 may illustratively form a part of an optical telephone communications system. Thus, for example, the array 11 may be situated in a central office, while a unique input waveguide 13 and a corresponding unique output waveguide 14 may be assigned to one of the subscribers to such central office. For local-to-local subscriber communications through such central office, the operation of one of the crosspoints 12 within the matrix 11 (e.g., by magneto-optic interaction in the manner to be described) will connect two local subscribers at the array 11. In such contemplated application, the waveguides 13 and 14 may take the form of optical fiber transmission lines, and will be referred to as fibers in the following description.

The crosspoints 12a–12b are disposed at the intersections of discrete light paths through the array 11. In the particular arrangement of FIGS. 1 and 2 such light paths are established as guided-mode channels through a thin planar optical film 21 disposed on a substrate 22.

Illustratively, the film 21 is a magnetic single-crystal iron-garnet layer that is epitaxially grown on a chemically processed [1,1,1] $Gd_3Ga_5O_{12}$ substrate. By proper choice of the lattice constants of the substrate and the magnetic thin-film, a magnetic anisotropy can be induced, with the easy axis thereof parallel to the plane of the film 21. In addition, by proper choice of the film thickness and proper selection of the relative refractive indices of the film 21 and the substrate 22, the guided modes in the film may be restricted to the lowest-order TE and TM modes (designated $TE_0$ and $TM_0$). Such expedients are well known to those skilled in the art.

Such arrangement of the film and substrate not only yields a large difference in refractive index therebetween relative to that which would normally be obtained if both the film and the substrate were isotropic, but also provides a large difference, within the film 21 itself, between the effective refractive indices respectively presented to the $TE_0$ and $TM_0$ modes.

Optical energy from the output end of the fiber 13a is coupled, via a thin-film grating 32 fabricated on the surface of the film 21, onto a first guided-mode optical path 36. As best shown in FIG. 2, the optical wave energy from the fiber 13a impinges obliquely downwardly onto the grating 32, which converts a portion of the incident rays into the desired film guided wave along the incident rays into the desired film guided wave along the path 36. By suitable choice of the polarization of the incident beam from the fiber 13a, a desired one of the TE and TM modes can be selected by the grating 32 as the polarization for the film guided waves propagating along the light channel 36; and it will be assumed that the polarization of the beam in the fiber 13a and the characteristics of the grating 32 are so chosen, in a conventional manner, that the $TE_0$ mode is selected for propagation along the path 36.

The grating 32 may be constructed as described, e.g., in an article by M. L. Dackss et al, "Grating Coupler for Efficient Excitation of Optical Guided Waves in Thin-Films", *Applied Physics Letters*, Vol. 16, No. 12, pages 523–525 (June 15, 1970). In particular, the fabrication of the grating 32 may be accomplished by conventional holographic techniques, e.g., by exposing a photoresist layer on top of the film 21 to the interference of a collimated laser beam and a cylindrically focused beam. The photoresist grating which remains after development serves as a mask through which the grating may be replicated, by ion etching, onto the surface of the film.

By analogy to the above, a thin-film grating 42 (FIG. 1) identical to the grating 32 may be defined on the film 21 for coupling light energy from the other illustrated input fiber 13b onto a second guided-mode light path 43 on the film 21. Again, the polarization of the beam from the fiber 13b, and the characteristics of the grating 42, are suitably chosen such that a $TE_0$ film-guided wave is launched in the light channel 43.

A pair of output thin-film gratings 46, 47, identical to the gratings 32 and 42, are also fabricated in the film 21 for coupling light energy selectively routed through the array 11 to one of the output fibers 14a and 14b via light channels 51, 52. In particular, the grating 46 is effective to couple light energy, propagating in the $TE_0$ mode on the light channel 51, onto the output fiber 14a, while the grating 47 is effective to couple light energy, propagating in the $TE_0$ mode on the channel 52, onto the output fiber 14b.

The output light channel 51 intersects the input light channels 36, 43 at the crosspoints 12a and 12c, respectively. Similarly, the output light channel 52 intersects the input light channels 36, 43 at the crosspoints 12b and 12d, respectively.

The $TE_0$ mode launched onto the light path 36 from the input optical fiber 13a passes through a first magneto-optic selection switch 61 associated with the crosspoint 12a. The switch 61 includes a photolithographically patterned, serpentine current conductor 62 (FIG. 3) which may be excited by current pulses as indicated below to produce a pulsed RF magnetic field that is directed along the path 36; such RF field is periodically reversed in direction as a result of the depicted geometry.

Suitable DC biasing facilities (not shown) may also be associated with the conductor 62 for establishing a steady magnetic field in the plane of the film 21 and directed at an acute angle (illustratively 45 degrees) to the axis of the light path 36. Because of the magnetic anisotropy caused, e.g., by the mismatch in lattice constant between the epitaxially grown iron-garnet film 21 and the underlying crystalline substrate 22, the total magnetization vector in the plane of the path 36 in the region encompassed by the conductor 62 may be rotated by the application of a relatively small magnetizing RF field in the conductor 62. Thus, by suitably pulsing the conductor 62, such magnetization vector (which is normally oriented at 45 degrees to the path 36) can be periodically switched into a direction along the axis of the path 36. Also, with a suitable choice of the periodic constants of the conductor 62 and the strength of the total magnetization vector along the path 36 when the conductor 62 is pulsed, a significant portion of the $TE_0$ mode energy normally propagating in the path 36 is converted into the $TM_0$ mode.

A discussion of the above-mentioned magneto-optic effect, together with design considerations for the switch 61, is set forth in an article by K. Tien et al, "Switching and Modulation of Light in Magneto-Optic Waveguides of Garnet Films", *Applied Physics Letters*, Vol. 21, No. 8, pages 394–396 (Oct. 15, 1972).

The current pulses for exciting the conductor 62 may illustratively be derived from a time-division switching pulse generator of the above-mentioned telephone communications system. Such pulses are preferably selectively applied via parallel pulse inputs on an "X" lead 91 and a "Y" lead 92. Under non-coincident pulse conditions, the incoming $TE_0$ mode is not significantly affected, and proceeds unconverted through the switch 61 toward the intersection of the light paths 36 and 51.

A second magneto-optic switch 101, identical to the switch 61, is associated with the crosspoint 12a and is positioned in the output light path 51 of the crosspoint. The switches 61 and 101 are arranged for joint excitation, and for this purpose the switch 101 is connected in series with the switch 61 by both the "X" lead 91 and the "Y" lead 92 as shown.

Since the magneto-optic effect provided by the switches 61 and 101 is reciprocal, a $TM_0$ mode propagating downwardly (as shown in the figure) from the intersection of the paths 36 and 51 through the switch 101 will be reconverted to the $TE_0$ mode by such switch when a serpentine conductor 102 thereof is simultaneously pulsed by the conductors 91 and 92.

A grating 121 is disposed at the intersection of the paths 36 and 51 in mode coupling relation to the associated magneto-optic switches 61 and 101. The grating 121 is preferably positioned at 45 degrees to the axes of each of the paths 36 and 51. The grating 121 may be fabricated holographically on the film 21 in a manner similar to that of the above-described input and output gratings 32, 42, 46 and 47 of the array 11.

By suitable choice of the periodicity of the grating 121, the attenuation constants presented thereby to incident $TE_0$ and $TM_0$ modes, respectively, can be made to differ significantly; this effect is discussed, e.g., in Abstract F3 on page 21 of the Digest of Technical Papers for the 1972 International Quantum Electronics Conference. In this way, the grating 121 functions as an effective polarization mode filter, which presents a relatively low insertion loss to an incoming $TE_0$ wave while presenting a substantially totally reflecting interface to an incoming $TM_0$ wave. By orienting the grating 121 at 45 degrees to the paths 36 and 57 as shown, such reflecting interface for the rejected $TM_0$ mode will cause wave energy in such mode to be directed from the incoming light path 36 into the intersecting light path 51.

The transparency of such 45 degree grating to the $TE_0$ mode is substantially independent of the direction of incidence of the wave energy; that is, the desired low insertion loss will be exhibited whether the wave energy is propagating toward the crosspoint in one of the input waveguides 13 or in one of the output waveguides 14. Moreover, the grating 121 will effect no significant interaction between optical beams simultaneously propagating toward the associated crosspoint in each of the constituent crossed optical paths.

Further details of the design of such grating-type mode filters are presented, e.g., in U.S. Pat. No. 3,891,302 issued to S. W. Daby et al on June 24, 1975, and in an article by T. P. Sosnowski, "Polarization Mode Filters for Integrated Optics", *Optical Communications*, Vol 4, No. 6, pages 408–412 (February/March 1972).

In the operation of the crosspoint 12a as described above (e.g., consisting of a pair of magneto-optic switches 61 and 101 mode-coupled to the 45 degree grating 121 at the intersection of the paths 36 and 51), the functioning of such crosspoints in the absence of coincidence of current pulses on the leads 91 and 92 will first be described. Under such conditions, a guided $TE_0$ wave launched on the light path 36 from the fiber 13a will pass essentially unimpeded and unconverted through the magneto-optic switch 61 and will impinge on the grating 121 at the intersection. Because of the low insertion loss of the grating to the $TE_0$ mode, such impinging wave energy will pass through the intersection and thereafter through the remaining unoperated crosspoints in the path 36 (e.g., the crosspoint 12b in FIG. 1) to be absorbed in a conventional reflectionless termination 151.

Upon a simultaneous excitation of the "X" and "Y" leads 91 and 92 at the crosspoint 12a, both of the serially-connected switches 61 and 101 at the crosspoint will be operated to convert optical wave energy incident thereon in one of the $TE_0$ and $TM_0$ modes into the other of such modes. In particular, wave energy in the $TE_0$ mode entering the crosspoint 12a on the path 36 will be initially converted, by the switch 61, into the $TM_0$ mode. When the so-converted mode reaches the 45 degree grating 121 at the intersection of the paths 36 and 51, such mode will be reflected by the grating toward the other magneto-optic switch 101 in the path 51. Such switch reconverts the reflected $TM_0$ mode to the $TE_0$ mode, which in turn will pass freely through the remaining unoperated crosspoints (e.g., the crosspoint 12c) disposed in the path 51 to be coupled onto the output fiber 14a.

Figure 4:
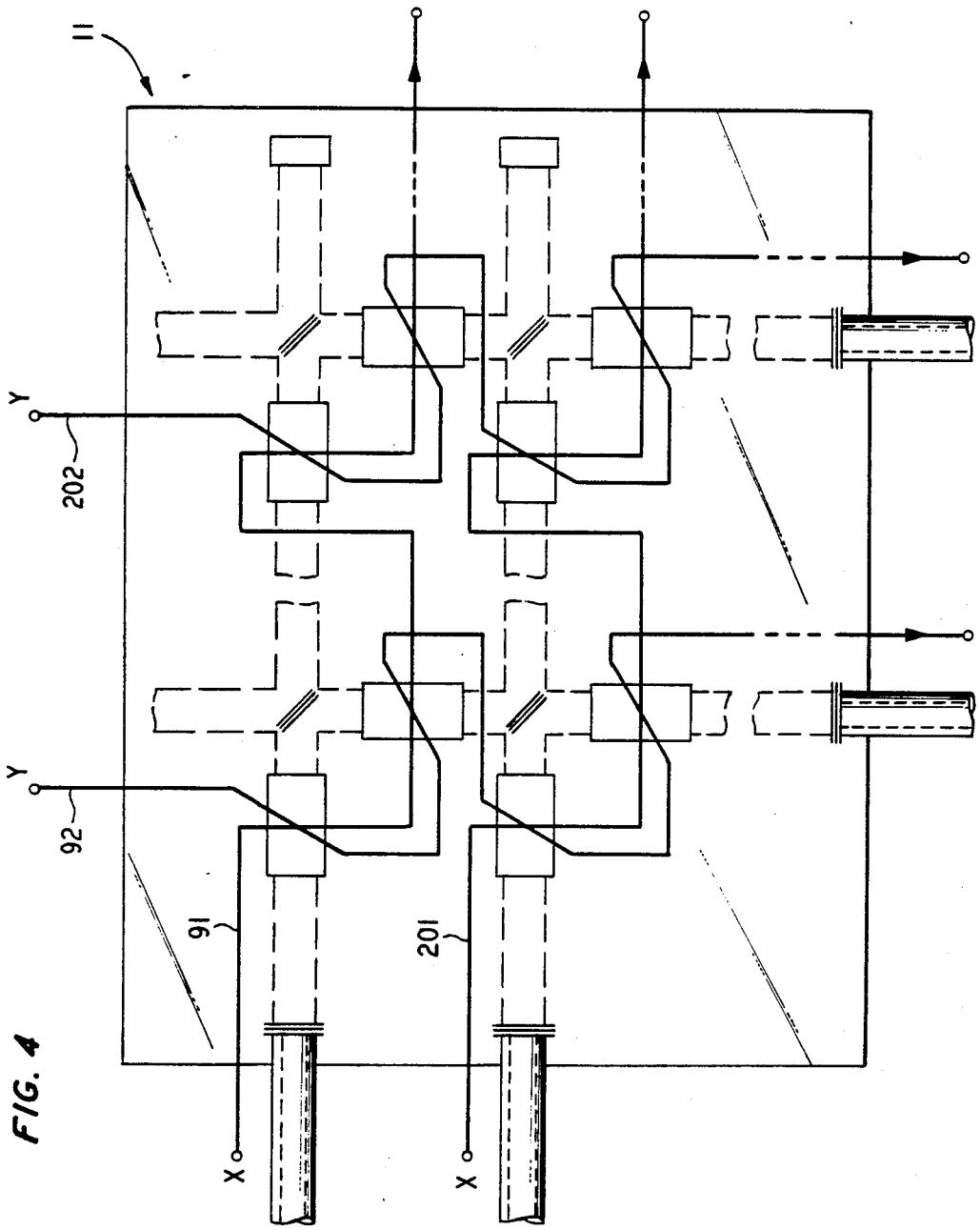
FIG. 4 is a plan view similar to FIG. 1, illustrating a system of pulse-operated "X" and "Y" leads threaded through the array for selectively operating the crosspoints.

It will be evident to those skilled in the art that "X" and "Y" current excitation leads corresponding to the leads 91 and 92 can be threaded in coordinate fashion through the various crosspoints of the array 11 so that a desired one of the crosspoints can be operated to the exclusion of all others. For example, as shown in FIG. 4, the "X" lead 91 extending through the crosspoint 12a also extends through all of the other remaining crosspoints in the light path 36, while the "Y" lead 92 extends through all of the remaining crosspoints in the light path 51.

In like manner, an additional "X" lead 201 extends through all of the crosspoints in the light path 43, while an auxiliary "Y" lead 202 extends through all of the crosspoints in the light path 52. It will be understood that the coincident excitation of a desired pair of the illustrated leads "X", "Y" will operate only the associated crosspoint.

Because of the magnetic nature of the thin-film 21 and the magneto-optic operation of the switches 61 and 101 at each crosspoint, it is convenient to provide suitable retentive memory in each of the switches 61 and 101. In this way, current pulses of one polarity coincidentally applied to a crosspoint with an appropriate amplitude from the related X-Y leads will establish one of two bistable states of the corresponding switches 61 and 101. A first one of such states can be suitably arranged to direct a mode-converting magnetic excitation along the direction of propagation of optical energy in the associated light path for the purpose described. Once such state is selected, excitation of the X-Y leads may be removed without de-energizing the crosspoint. Therefore, when the array 11 forms a switching matrix in a central office, a speech path may be maintained through such crosspoint from an input subscriber's fiber 13 to an output subscriber's fiber 14 until the state of the associated magneto-optic switches is changed. Such change may be accomplished, e.g., by suitably pulsing the associated X-Y leads with the opposite polarity.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an apparatus for controlling the direction of wave energy through a crosspoint of a pair of crossed optical wave guiding channels, each channel being supportive of optical wave energy in at least first and second modes:

mode-sensitive means associated with the crosspoint and responsive to the incidence thereon of optical wave energy from one of the channels in the first mode for directing such wave energy into the other of the channels;

mode switching means disposed in each of the channels in mode coupling relation to the directing means and operable for converting wave energy, incident thereon in one of the first and second modes, into the other of the first and second modes; and means for operating the mode switching means.

2. Apparatus as defined in claim 1, in which the directing means is substantially transparent to optical wave energy incident thereon from said one channel in the second mode.

3. Apparatus as defined in claim 1, in which one of the first and second modes is the $TE_0$ mode, and the other of the first and second modes is the $TM_0$ mode.

4. In an array of crossed optical wave guiding channels arranged in coordinate fashion to define a plurality of unique crosspoints, each channel being supportive of optical wave energy in prescribed first and second modes, apparatus for controlling the direction of wave energy through a selected one of the crosspoints, the apparatus comprising, in combination:

mode-sensitive coupling means associated with each crosspoint and responsive to the incidence thereon of wave energy in the first mode from one of the associated crossed channels for directing such wave energy into the other of the associated crossed channels;

a pair of normally unoperated mode switching means associated with each crosspoint and individually disposed in each of the constituent crossed channels in mode coupling relation with the directing means at such crosspoint, each mode switching means being operable for converting wave energy incident thereon in one of the first and second modes into the other of the first and second modes; and means for operating the mode switching means associated with the selected crosspoint.

5. Apparatus as defined in claim 4, in which the directing means is substantially transparent to optical wave energy incident thereon from said one channel in the second mode.

6. In an optical crosspoint switch:

a common planar substrate;

a plurality of thin-film optical energy propagating channels disposed on the substrate, the channels being arranged in crossed coordinate fashion to define an array of crosspoints, each channel being supportive of optical wave energy in prescribed first and second modes;

a plurality of reflection-type mode filter means individually supported on the substrate at the respective crosspoints, each filter means being responsive to the incidence thereon of optical wave energy in the first mode from one of the associated crossed channels for diverting such wave energy into the other of the associated cross channels;

a pair of mode switching means individually supported on the substrate in mode coupling relation to the directing means at each crosspoint, the mode switching means in each pair being individually disposed in the associated crossed channels at the crosspoint, each mode switching means being operable for converting wave energy incident thereon in one of the first and second modes onto the other of the first and second modes; and means for simultaneously operating the pair of mode switching means associated with a selected one of the crosspoints.

7. Apparatus as defined in claim 6 in which at least the portions of the channels associated with the mode switching means are formed from a magnetic thin-film material having a lattice constant related to that of the substrate so as to produce a magnetic anisotropy having an easy axis parallel to the plane of the channel.

8. Apparatus as defined in claim 7, in which each mode switching means comprises, in combination, means distributed along the associated channel for periodically varying the magnetization of the channel in the direction of wave propagation, and means magnetically coupled to the periodically varying means for selectively establishing a magnetic field along the associated channel.

9. Apparatus as defined in claim 6 in which the channels are subdivided into a plurality of mutually parallel first channels each having an input end and a plurality of mutually parallel second channels each having an output end and individually defining crosspoints with the first channels, and in which the apparatus further comprises means individually disposed on the substrate at the input ends of the first channels and at the output ends of the second channels for providing external coupling access to and from the associated channels.

* * * * *